INVENTOR.
WILLIAM H. CHANNELL
BY Calvin Brown
ATTORNEY

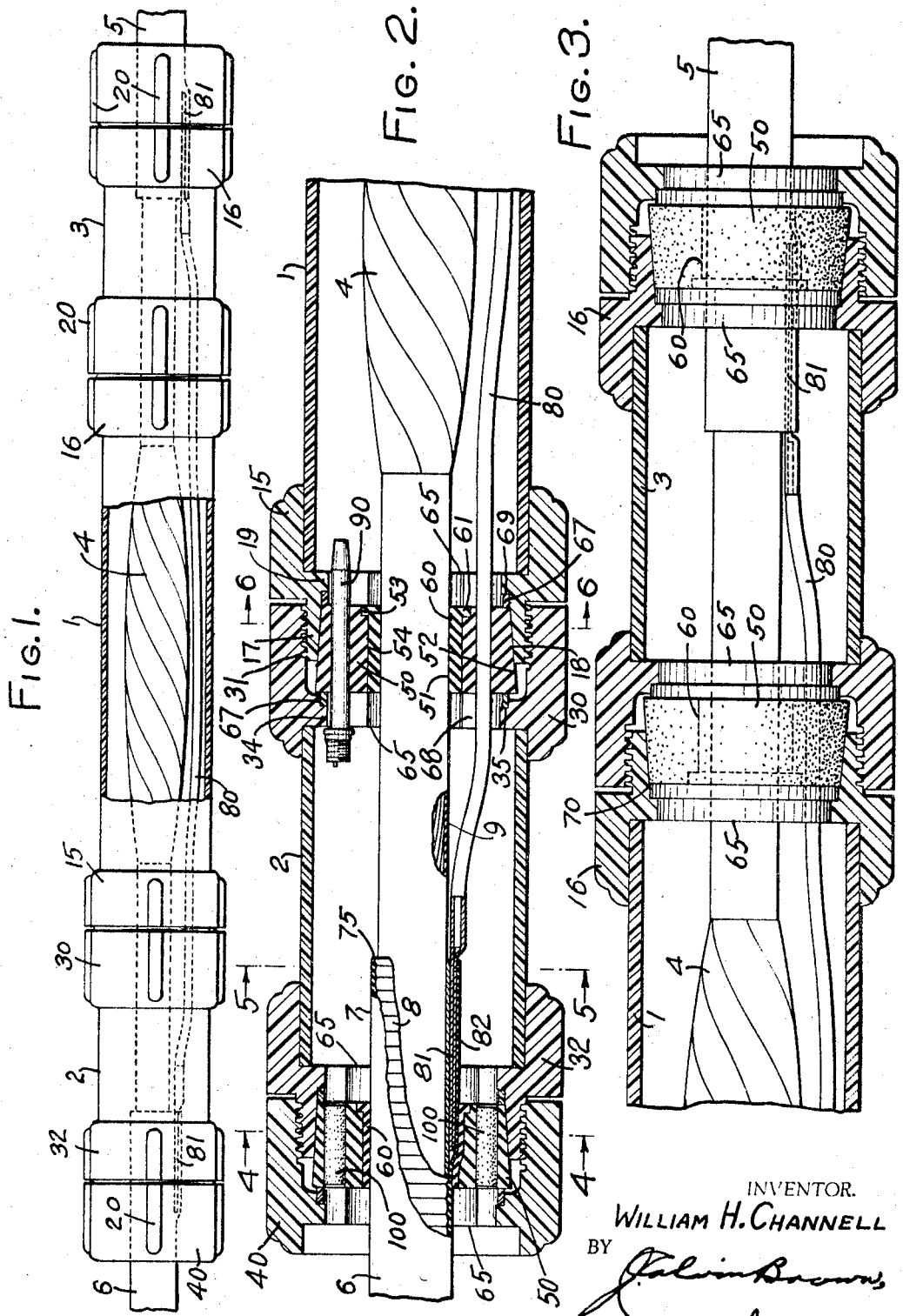

United States Patent Office 3,449,507
Patented June 10, 1969

3,449,507
CABLE SPLICE ENCLOSURE
William H. Channell, 122 Oak Tree Drive,
Glendora, Calif. 91740
Filed Dec. 5, 1966, Ser. No. 599,063
Int. Cl. H02g 15/08
U.S. Cl. 174—93
2 Claims

ABSTRACT OF THE DISCLOSURE

A cable splice enclosure for multiple sheath cables, having end section sleeves attached to the ends of a cable splice sleeve by securing means, the cable splice sleeve receiving the cable splice with all cable sheaths save the innermost sheath being terminated in an end section sleeve and the innermost sheath extending into the cable splice sleeve, and separate sealing means for sealing the innermost cable sheath and for sealing the remaining cable sheaths in an end section sleeve.

---

The present invention is adaptable for use with multiple-sheath cables. Such a type of cable requires either the applying of air pressure or the making of a moisture proof seal at the inner sheath of the cable.

An object of the present invention is to prevent moisture or air from seeping between the inner and outer sheaths of the cable. Thus after a cable splice has been made and duly wrapped, it becomes essential that a splice enclosure or sleeve for said splice be fluid tight so that moisture may not enter the sleeve and cause corrosion of the metallic shield which usually surrounds the cable.

A further object is the provision of a cable splice enclosure which prevents moisture from entering between the cable sheaths.

A further object is the provision of a cable splice sleeve which effectively isolates portions of the cable sheaths relative to the splice and which assures that the sleeve containing the splice is rendered not only airtight, but moisture proof as well.

Another object is the provision of a cable splice sleeve construction wherein cable sheaths are terminated in separate sleeves which are joined to a sleeve holding the cable splice, the separate sleeves isolating the cable sheaths and the splice so as to maintain the sleeve containing the cable splice moisture free and either pressurized or unpressurized.

With respect to the foregoing object and assuming a single cable splice, the cable splice is placed in an intermediate sleeve which has connected at each end thereof additional sleeve sections. The cables leading to the splice have certain of their sheaths removed or terminated in the end sections with the innermost insulation cable sheath received in the sleeve which houses the cable splice. This construction effectively isolates the splice and certain of the sheaths such as the outermost sheath and the metallic sheath in the end sections.

The present invention utilizes multiple interconnected sleeve sections which assure that the cable splice in an intermediate sleeve section is moisture and airtight while other sections secured to the intermediate sleeve section may be maintained pressurized or unpressurized.

At the present time industry generally employs epoxy poured over the entire cable splice to seal the inner and outer cable sheaths. However, the difference in expansion between the epoxy and the cable sheaths renders this undesirable and subject to both moisture and air leakage as well as rendering it practically impossible to enter the unit without destroying it.

Another method used by industry is to expose the inner sheath and subsequent sheaths and then tape the outer sheath to isolate it from the inner sheaths followed by applying a protective covering over the tape. This latter method is quite laborious and not satisfactory in actual practice.

In the drawing:

FIGURE 1 is a fragmentary partially sectional view of the splice enclosure of the invention;

FIGURE 2 is a fragmentary enlarged longitudinal sectional view illustrating constructional details of the splice enclosure of FIGURE 1;

FIGURE 3 is an enlarged fragmentary longitudinal sectional view being a continuation of FIGURE 2;

Figure 4:
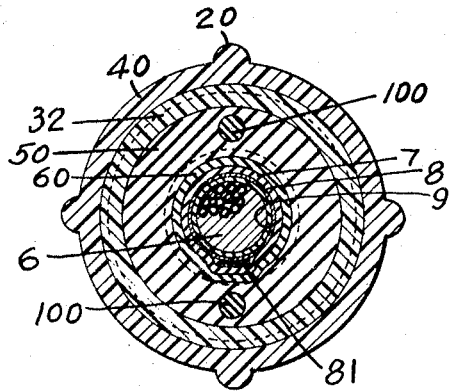
FIGURE 4 is a cross sectional view on the line 4—4 of FIGURE 2.
Figure 5:
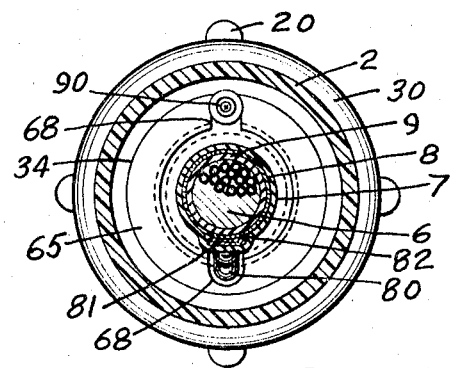
FIGURE 5 is a cross sectional view on the line 5—5 of FIGURE 2.

Referring specifically to FIGURES 1, 2, and 3, wherein a basic concept of the cable splice enclosure is illustrated, sleeve 1 being termed an intermediate sleeve, is positioned between two sleeves 2 and 3 termed end sections. The intermediate sleeve 1 houses a cable splice 4 while the end sections house terminated ends of the cable sheaths. As shown in the drawing, the invention is illustrated by utilizing two cables 5 and 6 the wires of which have been spliced to provide splice 4. Each cable 5 and 6 in its simplest embodiment includes an outer insulation sheath 7, an inner metallic sheath 8 which is usually a steel armor tape and an inner insulation sheath 9 which surrounds the cable wires. Thus for each cable end the end sections 2 and 3 house in part the external insulation sheath 7 and the metallic sheath 8 while the inner insulation sheath 9 continues through each end section into the intermediate section 1 which houses the splice 4. The cable 5 would be similar to the arrangement for cable 6 so far as the cable sheaths are concerned. The intermediate sleeve 1, as well as the end sleeve sections 2 and 3 may be molded from a plastic such as for instance ABS which is acrylonitrile-butadiene-styrene which has a high impact strength, dimensional stability, heat and chemical resistant and hard surface. Other material may be used and ABS is just illustrative. The intermediate sleeve 1 is substantially of uniform diameter throughout its length and has bonded at its ends adapters 15 and 16. Each adapter 15 and 16 is of similar form and the adapter 15 will be described. Adapter 15 is provided with an externally threaded end extension 17. The adapter 15 is annular in form and extension 17 is provided with a tapered seat 18 which converges inwardly to an annular flange 19. Externally, the adapter is provided with spaced apart longitudinal ribs 20. The adapters 15 and 16 are adapted to join adapters carried by ends of the sleeve sections 2 and 3. As both sections are identical construction the section 2 will be referred to, the same numbers or reference applying to section 3. Section 2 has an adapter 30 which is internally screw threaded at 31 for connection with the threads 17 of adapter 15. Section 2 carries an adapter 32 at its opposite end, which adapter is constructed the same as the adapter 15 at ends of the intermediate sleeve 1. As was the case for the intermediate sleeve 1, the end section sleeve 2 is bonded to the adapters 30 and 32 by the ends thereof being received within the confines of said adapters. Adapter 30 is internally provided with an annular flange 34 which flange is provided at 35 with an annular ledge or step portion, which step portion faces the threaded area 31. The internal diameter of the flange 34 is slightly less than internal diameter of the end sections 2 and 3 so as to provide an abutment for ends of the section, as shown in FIGURE 2. The adapter 32 for end section 2 is threaded to an internally threaded adapter 40 similar in constrction to the adapter 30. Thus the end sections 2 and 3 have different types of adapters for the ends thereof while the intermediate section 1 has adapters of like form at its ends. The reason for this construction will be detailed in the statement of the operation.

Figure 8:
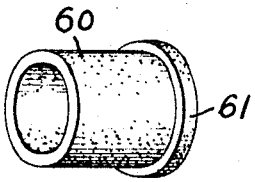
FIGURE 8 is a perspective view of a bushing which may be used in the grommet of FIGURE 7.
Figure 6:
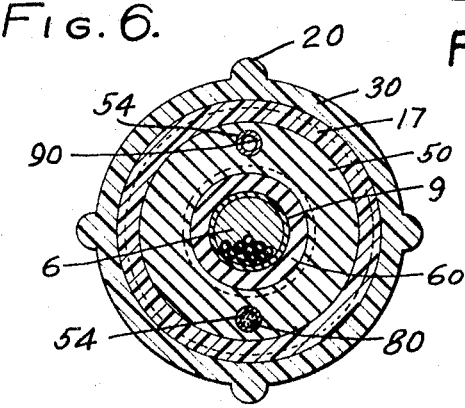
FIGURE 6 is a cross sectional view on the line 6—6 of FIGURE 2.
Figure 7:
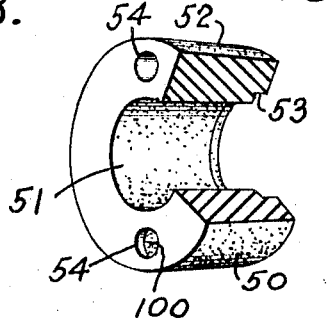
FIGURE 7 is a perspective view, partly in section, of a grommet used in the practice of the invention.
Figure 9:
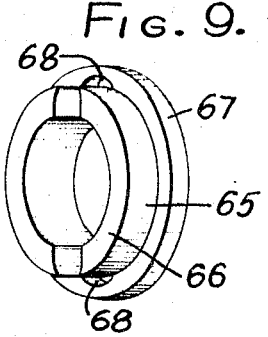
FIGURE 9 is a perspective view of a washer of the type used at both ends of the grommet of FIGURE 7.
Figure 10:
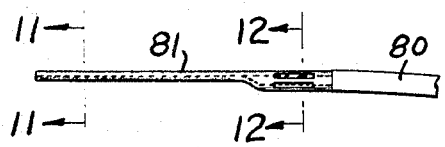
FIGURE 10 is a fragmentary side view of a connector for joining the metal sheaths of cable ends.
Figure 11:
FIGURE 11 is a cross sectional view on an enlarged scale taken on the line 11—11 of FIGURE 10.
Figure 12:
FIGURE 12 is a cross sectional view on the line 12—12 of FIGURE 10, on an enlarged scale.
Figure 13:
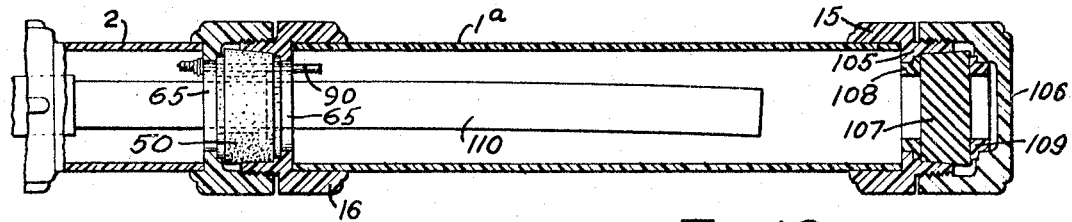
FIGURE 13 is a fragmentary longitudinal sectional view of a cable splice enclosure having a blank end.

In order to make the intermediate sleeve 1 moisture tight or to maintain the interior of the intermediate sleeve pressurized or unpressurized, grommets are utilized in conjunction with the end adapters. A grommet of the type utilized in the present invention is shown in FIGURE 7 and designated as 50. The grommet may be formed from suitable material such as a rubber, neoprene, or other suitable material and said grommet has a central bore 51 of uniform diameter, a tapered outer surface 52, and a counterbore 53 at the smallest diameter end thereof which counterbore is of greater diameter than the bore 51. In addition, the grommet is provided with a transverse bore 54. There may be a multiple number of transverse bores 54 and two of said bores are shown in FIGURE 7. The grommet is interposed between the adapters 15 and 30 as well as between adapters 32 and 40. In the present instance the central bore 51 of the grommet may receive a bushing 60 of the type shown in FIGURE 8. This bushing has an external flange 61 at one end thereof, which flange is adapted to fit within the counterbore 53 as shown in FIGURE 2 so that the flange end of the bushing and the smallest diameter end of the grommet are flush. A bushing 60 is selected for use that will closely fit the cable sheath. Thus the cable with all of its sheaths intact is passed inwardly of the adapters 32 and 40 and through the hole 51 of a grommet 50 or through a bushing 60 carried by the grommet. The grommet with its bushing maintains a tight engagement with the surface of the outermost sheath 7 of the cable length 6, particularly when the adapters 32 and 40 are secured together. To assure that there will be a tight engagement between the cable sheaths and the grommet and its bushing, washers 65 of the type illustrated in FIGURE 9 are provided at both ends of the grommet. The washers 65 may be formed of a plastic sufficient in strength to compress the grommets and the bushing therebetween when the adatpers 32 and 40 are threaded together. As shown in FIGURE 9 the washer 65 has an annular body portion 66 and an end flange 67. The end flange and the body portion are transversely bored, as shown at 68. The end flange 67 has a diameter substantially equal to the diameter of the small end of the grommet as shown in FIGURE 3 at 70. The bores 68 of the washer are adapted to match and be in axial alignment with the bores 54 of the grommet as seen in FIGURE 2. Furthermore, the central bore of the washer has a greater diameter than the diameter of the central bore 51 of the grommet. In other words, the washers bear against ends of the grommet. As shown in FIGURE 2, the annular step or ledge 35 receives the flange 67 of the washer for the large end of the grommet while the small end of the grommet bears against the flanged end of the washer, the flange of which is held by the flange 19 of adapter 15, as shown at 69. This stabilizes the position of the grommet and its bushing between the end washers 65, the end washers in turn being engaged by the interconnected adapters 15 and 30. The same construction is followed for the grommets positioned between the end adapters 32 and 40. Further, considering the end section 2, the cable 6 is adapted to have the wires thereof spliced to the cable 5 and the cable prior to splicing is passed through the grommet and its bushing which is held between the adapters 32 and 40 and into the sleeve of end section 2. At this particular point the outer sheath 7 and metallic sheath 8 are terminated at 75. The remainder of the cable 6 and its sheath 9 which surrounds the wires of the cable, is passed through the grommet and the bushing as well as the washers held within and between the adapters 15 and 30 for reception within the intermediate sleeve 1. The cable wires of the cables 5 and 6 having been spliced and rewrapped, the splice is confined within the intermediate sleeve 1 as shown in FIGURES 2 and 3. It is essential that the metallic sheath of the cables 5 and 6 be interconnected and this accomplished by the use of a cable shield connector 80 which extends from the end sections 2 and 3 through the intermediate sleeve 1. This cable shield connector is passed through one of the bores 54 of the grommet and through one of the bores 68 of the washers 65. Ends of the cable shield conectors are provided with flattened tubes, as seen in FIGURES 10, 11 and 12 and designated as 81, which flattened ends are positioned between the metallic sheath 8 and outer insulation sheath 7, as shown in FIGURE 2 at 82. Thus electrically the metallic sheaths for cables 5 and 6 are interconnected. Where two bores 54 are utilized in the grommet, a tube 90 may be passed through bore 54 as well as bores 68 of the washers into the intermediate sleeve 1, as shown in FIGURE 2. This tube provides a communication between intermediate sleeve 1 and section 2 while in certain adaptations the grommet may have the bores 54 filled by plugs 100 so as to close any communication between the sleeves 1 and 2 or 1 and 3. As has previously been pointed out the adapters for sleeve 3 are the same as that described for end section 2. The present invention adapts itself to various uses and purposes such as illustrated in FIGURE 13 wherein an elongated section 1a is provided similar to the intermediate section or sleeve 1 and which has end adapters of the type shown at 15 and 16. One end of the sleeve 1a is connected with an end section similar to that designated as 2 so far as construction is concerned. However, the adapter 15 for section 1a and end 105 receives a cap 106 which is threaded to the end adapter 15. The cap and the end adapter enclose a grommet 107 which is not provided with a central hole 51 nor with holes 54 but does have washers 108 and 109 on opposite ends of said grommet 107. These washers are not provided with holes 68. Thus when the cap 106 is threaded to the adapter 15 at 105 the grommet is compressed between the washers to make the interior of the sleeve air tight. Such a construction is useful where one cable length, as shown at 110 is not spliced but simply terminates within the sleeve.

Figure 14:
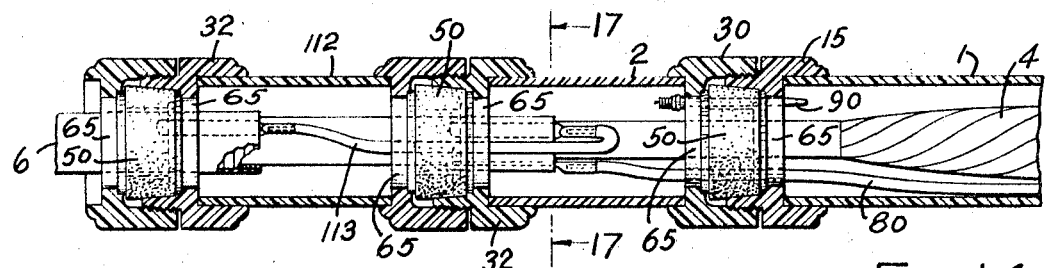
FIGURE 14 is a fragmentary longitudinal sectional view illustrating several sleeve sections for a cable having multiple sheaths.

In the construction shown in FIGURE 14 an intermediate sleeve 1 is provided at its ends with adapters of the character shown at 15 and 16 which adapters secure other adapters provided on an end section such as 2 and which end section in turn is connected to a following section of identical construction as shown at 112, this section being similar to section 2 as to the character of adapter ends while section 112 in turn is secured to an adapter of the character of that shown at 32 in FIGURE 2. This construction may be followed where a cable has multiple sheaths. Thus in the cable shown, the cable would have an external sheath, an inner metallic sheath, a further insulation sheath followed by a metallic sheath and an insulation sheath, the metallic sheath of this cable being interconnected by or bonded by a cable sheath connector as shown at 113 and the sheath of the cable within section 2 being in turn connected to the metallic sheath by a sheath connector such as shown at 80 in FIGURE 2 for the opposite cable length which has been spliced, the splice of which is received in intermediate sleeve 1. Thus the connector 113 might continue and pass through the intermediate sleeve 1 to the metal sheath shown at the opposite end for the opposite cable.

Figure 15:
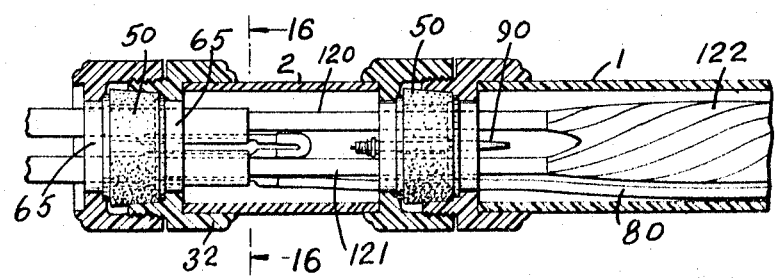
FIGURE 15 is a fragmentary longitudinal sectional view of a cable splice enclosure housing two spliced cables.
Figure 17:
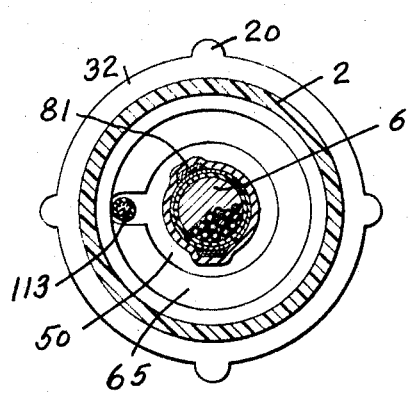
FIGURE 17 is an enlarged transverse sectional view on the line 17—17 of FIGURE 14.
Figure 16:
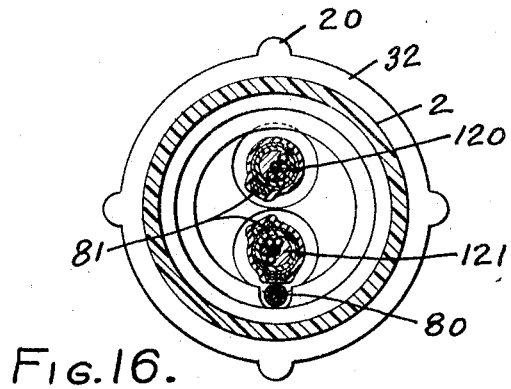
FIGURE 16 is an enlarged transverse sectional view on the line 16—16 of FIGURE 15.

In FIGURE 15 I have illustrated the use of two cables 120 and 121 passed through a grommet provided with two holes for passage therethrough of the cables 120 and 121, see FIGURE 16. The cables are spliced together as shown at 122, the splice being within the intermediate sleeve. The metallic sheaths for the cables 120 and 121 are connected by sheath connectors to the cables at the opposite ends of the splice.

The operation, uses and advantages of the invention just described are as follows.

The cable splice sleeve in its several adaptations provides a structure adaptable to one or more cable splices and wherein the cable splices are maintained in a sleeve which is pressurized or non-pressurized and moisture proof. This is accomplished through the means of additional sleeve sections axially joined to an intermediate sleeve which holds the cable splice or splices. The sleeves which constitute the end sections may or may not be pressurized and moisture proof. However, the addition of an end section sleeve is such that the end section sleeve may be either removed from the intermdeiate cable splice sleeve for access to the cable splice followed by reassembly of the end section to the intermediate sleeve holding the splice. It is intended that the cable ends which are to be spliced should have certain of the sheath members of said cable removed and positoned within an end section while the cable ends which are to be spliced continue with the inner sheath into the intermediate sleeve to hold the splice. The arrangement is such that the cable wires and usually an insulation sheath surrounding the wires should be firmly held by grommets which are secured to the intermediate end sections by means of threaded adapters. Thus any air leakage between the cable sheath members will occur in an end section and no leakage will occur in said cable splice sleeve. Thus the invention permits axial joinder of many sleeve members with accommodation of multiple cables and the splices therefor as, for instance, has been illustrated and described for FIGURE 14. By removing the outermost cable sheath as well as terminating the metallic sheath by leaving the innermost insulation sheath which surrounds the wires intact, which latter sheath and the wires are positioned within the splice sleeve, moisture and air which might be received within an end section is prevented from having access into the splice sleeve because of the presence of the grommets and bushings held between the threaded adapters for contiguous ends of the splice sleeve and an end section. As previously stated, the adapters are readily separable by unscrewing. Therefore, it is unnecessary to use tape and epoxy for preventing moisture from entering a splice sleeve. The present invention allows the operator to readily disconnect by unscrewing the threaded adapters for access within the splice sleeve or the end section sleeve and without harming the cable or in any manner having to remove epoxy or other insulation means. Thus, in FIGURE 2 if it is desired to pressurize the interior of the splice sleeve this is conveniently done by directing air or other gas under pressure against the valve end of the tube 90. The ribs 20 on the adapters permit either a securing together of the adapters by hand or through use of a spanner wrench. If the splice sleeve is pressurized, water is prevented from entering between the cable sheaths into the splice sleeve.

At the present time the industry has placed on the market multiple-sheath cables. In the simplest embodiment the core is surrounded by an inner sheath of insulation material followed by a metallic sheath and then an outer sheath of insulation material. The outer insulation sheath is for the purpose of protection only and protects the metallic sheath against corrosion. However, the present invention is devised particularly for the purpose of preventing moisture from seeping between the outer and inner metallic sheaths by providing a seal for the innermost cable sheath and additional seals for each subsequent sheath.

I claim:

1. A cable splice enclosure for multiple sheath cables, including: a cable splice sleeve, end section sleeves attached to ends of said cable splice sleeve, the cable passing through said end section sleeves into the cable splice sleeve, all cable sheaths save the innermost sheath being terminated in an end section sleeve and the innermost sheath of said cable being within both the cable splice sleeve and an end section sleeve, and means at ends of each joined sleeve for securing said sleeves together and separate means for sealing the innermost cable sheath and for sealing the remaining sheaths of said cable in an end section sleeve; said first named means including a pair of interconnected adapters carried at ends of each sleeve section, and said second named means comprising grommets between said adapters and surrounding a cable sheath.

2. A cable splice sleeve for multiple sheath cables, the cable wires being joined in a splice, including: a sleeve for housing the cable splice, end section sleeves attached to ends of said cable splice sleeve, each cable end having an inner insulation sheath, a metallic sheath, and an outer insulation sheath, the outer insulation sheath and the metallic sheath being terminated within an end section sleeve while the inner insulation sheath continues to the cable splice in the cable splice sleeve, and sealing means carried at the attached ends of the cable splice sleeve and an end section sleeve for sealing the innermost insulation sleeve to render the interior of the cable splice sleeve moisture proof; said sealing means comprising grommets interposed between ends of the cable splice sleeve and an end section sleeve, and adapters carried by ends of both the cable splice sleeve and an end section sleeve confining said grommets and providing for detachable connection of said sleeves.

References Cited

UNITED STATES PATENTS 3,061,666 10/1962 Duvall et al. _____ 174—92
3,381,082 4/1968 Peterson _____ 174—93

DARRELL L. CLAY, *Primary Examiner.*

U.S. Cl. X.R.

174—22, 77